United States Patent
Akimoto et al.

[11] Patent Number: 6,081,573
[45] Date of Patent: Jun. 27, 2000

[54] REACTOR INTERNAL EQUIPMENT HOISTING APPARATUS

[75] Inventors: Jun Akimoto, Yokohama; Kenjiro Fukamichi, Tsukui-Gun; Kazuo Sudo, Yokohama, all of Japan

[73] Assignee: Kabushiki Kaisha Toshiba, Kawasaki, Japan

[21] Appl. No.: 09/114,929

[22] Filed: Jul. 14, 1998

[30] Foreign Application Priority Data

Jul. 18, 1997 [JP] Japan ................................ 9-193510

[51] Int. Cl.⁷ .................................................. G21C 19/00
[52] U.S. Cl. .......................................... 376/263; 254/290
[58] Field of Search .................................. 376/260, 262, 376/263; 254/291, 292, 290

[56] References Cited

U.S. PATENT DOCUMENTS

| | | | |
|---|---|---|---|
| 3,282,793 | 11/1966 | Jamrog ..................................... | 376/263 |
| 3,768,668 | 10/1973 | Schukei .................................... | 376/262 |
| 4,199,857 | 4/1980 | Meuschke et al. ....................... | 376/260 |
| 5,043,132 | 8/1991 | Schramm et al. ....................... | 376/260 |
| 5,225,150 | 7/1993 | Malandra et al. ....................... | 376/263 |
| 5,400,374 | 3/1995 | Baversten ................................. | 376/260 |
| 5,734,690 | 3/1998 | Sakamaki ................................. | 376/262 |

FOREIGN PATENT DOCUMENTS

09236689  12/1995  Japan .

*Primary Examiner*—Katherine A. Matecki
*Attorney, Agent, or Firm*—Foley & Lardner

[57] ABSTRACT

There is provided a reactor internal equipment hoisting apparatus which is hung down from an upper side of a reactor pressure vessel to hoist reactor internal equipment installed inside the reactor pressure vessel. The hoisting apparatus includes a supporting unit which is hung down from the upper side of the reactor pressure vessel with an overhead travailing crane installed on the ceiling of the reactor building, and an elevating unit which is arranged below the supporting unit. A coupling/fixing unit is provided to the elevating unit to be releasably coupled with a hoisting lug. Power hoist using a wire rope or a chain is provided to the supporting unit. The elevating unit is hung down from the supporting unit via the rope or the chain to be moved vertically. This reactor internal equipment hoisting apparatus is easy in maintenance and storage.

17 Claims, 9 Drawing Sheets

REACTOR INTERNAL EQUIPMENT HOISTING APPARATUS

BACKGROUND OF THE INVENTION

1. Field of the Invention

The present invention relates to a reactor internal equipment hoisting apparatus for hoisting equipment in a reactor such as dryer, shroud head, etc. installed in a reactor pressure vessel (abbreviated as a "RPV" hereinafter) of a boiling water reactor (abbreviated as a "BWR" hereinafter).

2. Description of the Related Art

A large number of fuel assemblies are loaded in the inside of the RPV of the BWR, and a core consists of these fuel assemblies.

Figure 7:
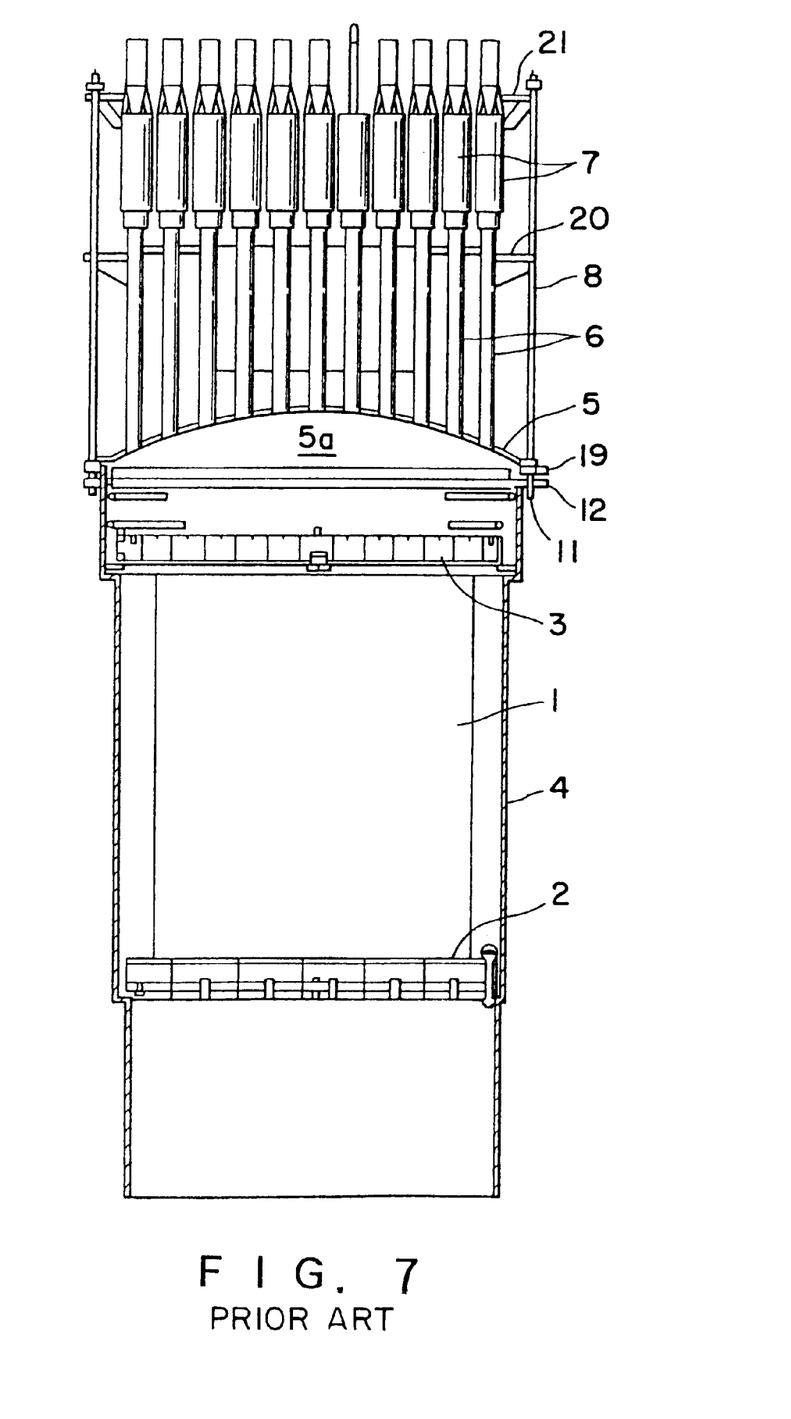
FIG. 7 is a vertical sectional view showing a reactor internal structure of the BWR.

FIG. 7 is a vertical sectional view showing a reactor internal structure of the BWR. As shown in FIG. 7, a core support plate 2 is placed below the core 1 and a number of fuel assemblies (not shown) constituting the core 1 are supported at their bottom ends by the core support plate 2. Also, an upper grid 3 is arranged over the core 1 such that upper portions of the fuel assemblies are supported by the upper grid 3. The core 1 is surrounded by a cylindrical core shroud 4.

A top portion of the core shroud 4 is covered with a shroud head 5 which forms a plenum 5a. A number of standpipes 6 are stood upright on the shroud head 5 and a plurality of steam separators 7 are connected to respective top portions of the standpipes 6. The steam separators 7 perform steam and water separation of the core water which has been converted into a two phase flow when it is heated by the core 1, and then the separated steam is fed to a dryer (not shown).

When the reactor is operated, the pressure and the temperature of the core 1 are increased by virtue of heat generated by fission reaction of the nuclear fuel and internal pressure is applied to the shroud head 5. In addition, when an earthquake happens, tipping loads are applied to the shroud head 5 and the standpipes 6.

In order to support such internal pressure and such tipping loads, the shroud head 5 is tightened against the core shroud 4 by several tens of shroud head bolts 8 and fixed thereto.

Figure 8A:
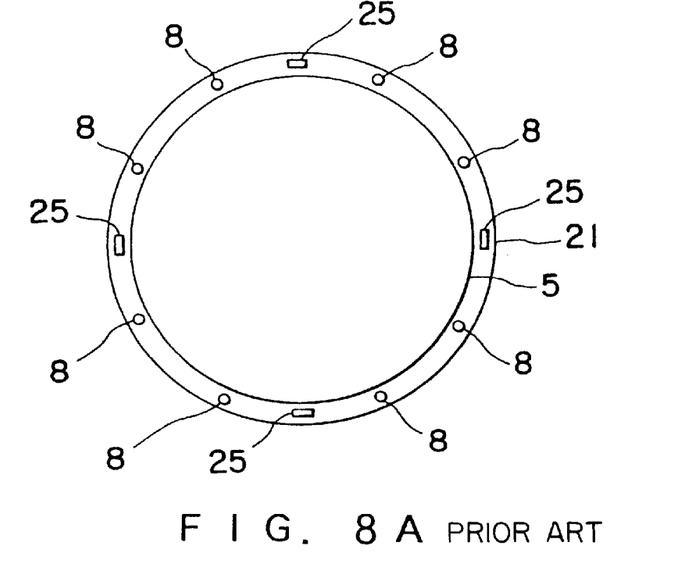
FIG. 8A is a top view showing a shroud head of the BWR.
Figure 8B:
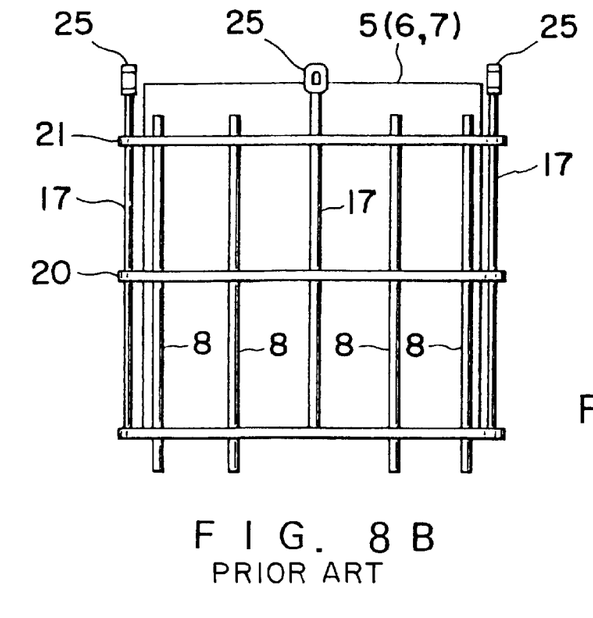
FIG. 8B is a side view showing the shroud head of the BWR.
Figure 8C:
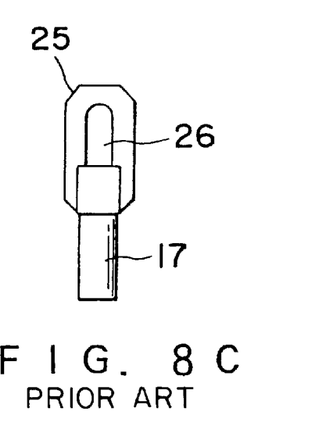
FIG. 8C is a partially enlarged view showing a hoisting lug of the shroud head of the BWR.

FIG. 8A is a top view showing the shroud head 5 of the BWR, FIG. 8B is a side view showing the shroud head 5 of the BWR, and FIG. 8C is a front view showing a hoisting lug 25 of the shroud head 5 of the BWR. As described above, a number of shroud head bolts 8 are provided around the outer peripheral surface of the shroud head 5, the standpipes 6, and the steam separator 7. These shroud head bolts 8 are inserted in fitting holes (not shown) of lower and upper guide rings 20, 21.

Four rods 17 are provided around the outer peripheral surfaces of the shroud head 5, the standpipes 6, and the steam separator 7 at 90 degree interval. Hoisting lugs 25 shown in FIG. 8C are provided to top ends of each of the rods 17. Hoisting holes 26 into which hooks of shroud head hoisting tools (not shown) are hooked to hoist the shroud head 5 from the RPV are formed in the hoisting lugs 25.

FIGS. 8A and 8B show a configuration in which four rods 17 with the hoisting lugs 25 are evenly spaced at intervals at 90 degree, but the arrangement pattern of the hoisting lugs 25 and the rods 17 are not limited to this configuration. For instance, there is a case where the hoisting lugs 25 and the rods 17 may also be arranged according to an arrangement shown in FIG. 9.

When conducting periodic inspections or fuel exchanges of the reactor, first the shroud head bolts 8 are unscrewed by using a long shroud head bolt wrench from the fuel exchanger. Then, the hoisting apparatus which is hoisted by a main hoisting hook of an overhead travailing crane installed on the ceiling of the reactor building is hung down into the RPV, then the shroud head 5 is clamped by the hoisting apparatus, and then the shroud head 5 is lifted from the RPV to be transferred into an equipment storage pool.

In this case, if the wire rope and the hook of the overhead travailing crane are submerged into the core water with radioactivity during the hoisting operation of the shroud head 5, radioactive contamination is spread over the operation floor.

For this reason, when conducting the hoisting operation of the shroud head 5, first a level of the core water in the reactor well should be lowered previously to some extent, then the hoisting apparatus is hung down into the RPV to grasp the shroud head 5.

While keeping a distance between the level of the core water and the hook of the overhead travailing crane appropriately, the shroud head 5 is gradually lifted correspondingly as the level of the core water in the reactor well is risen gradually. On the contrary, when the removed shroud head 5 is fitted into the RPV again, the shroud head 5 is lowered gradually in accordance with the gradual fall of the level of the core water.

However, upon the above removing and fitting operations of the shroud head 5, since the shroud head 5 must be lifted/lowered slowly in accordance with the slow elevating speed of the core water of the reactor well, there has been such a problem that it take a long time to carry out the above operations.

Figure 10:
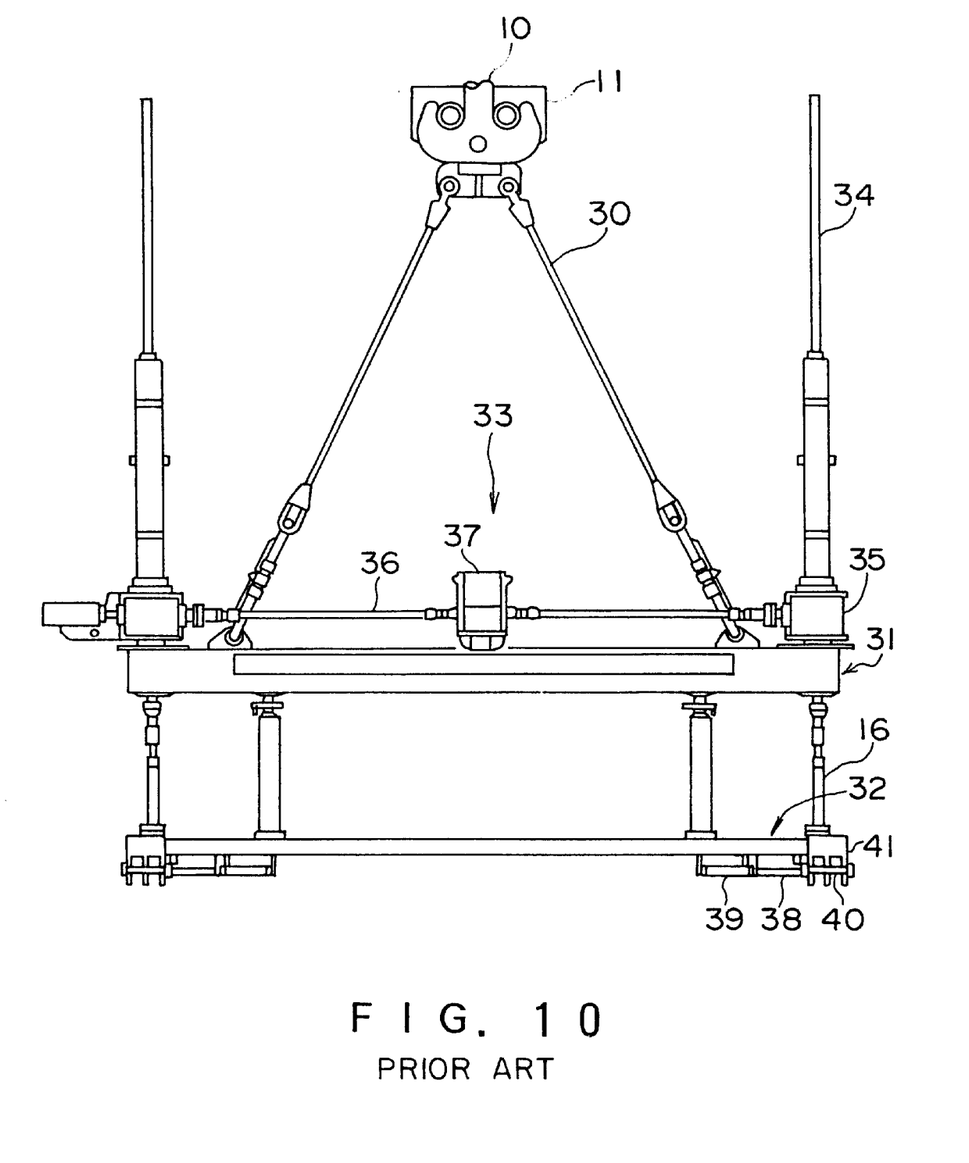
FIG. 10 is a front view showing a schematic configuration of a reactor internal equipment hoisting apparatus in the related art.

Therefore, in order to reduce times required for the above removing and fitting operations of the shroud head 5, the reactor internal equipment hoisting apparatus shown in FIG. 10 has been proposed. Even when the reactor well is filled with the core water, this hoisting apparatus can handle the shroud head 5 in the core water without immersion of the hook 10 and the wire rope of the overhead traveling crane in the core water.

The hoisting apparatus shown in FIG. 10 has a supporting frame 31 which is hung down from the hook 10 of the overhead traveling crane by using the hoisting wires 30 and the hook box 11. The supporting frame 31 consists of a pair of beams which intersect orthogonally with each other.

An elevating frame 32 which is constructed by coupling a pair of beams to intersect orthogonally with each other is provided below the supporting frame 31. This elevating frame 32 can be vertically moved by an elevating unit 33 with respect to the supporting frame 31.

The elevating unit 33 has four elevation driving rods 34 composed of roller screws. Lower ends of these elevation driving rods 34 are connected to the upper end surface of the elevating frame 32 via connecting shafts 16.

In addition, the elevation driving rods 34 are inserted into gear boxes 35 provided on an upper end surface of the supporting frame 31. The gear boxes 35 are coupled with elevation driving unit 37 via gear driving rods 36 respectively. The elevation driving unit 37 consist of a power motor (not shown) and a worm reducer (not shown).

Cylinders 39 having piston rods 38 are provided to the elevating frame 32 and connector pins 40 are fitted to top ends of the piston rods 38. The connector pins 40 can be releasably inserted into pin insertion holes (not shown), which are formed in positioning members 41, by moving back and forth the piston rods 38 of the cylinders 39.

When equipments such as the shroud head 5, etc. in the reactor are pulled out of the RPV with the use of the hoisting apparatus shown in FIG. 10, the hoisting apparatus is hung down into the RPV by the overhead traveling crane in the state that the reactor well is still filled with the core water. Then, the hoisting apparatus is put onto the reactor internal equipment by operating the overhead traveling crane. At that time, the hook 10 and the wire rope (not shown) of the overhead traveling crane can be prevented from being immersed into the core water by keeping the supporting frame 31 and the elevating frame 32 spaced sufficiently apart.

However, there has been another problem that, since the elevating driving unit 37, gear boxes 35, gear driving rods 36 constituting the elevating unit 33 are large and complicated mechanism, decontamination operations of the hoisting apparatus becomes difficult after using the hoisting apparatus.

Further, there has been still another problem that, since lengths of the elevating drive rods 34 must be set longer than elevation strokes (about 6 m) of the elevating frames 32, a storage area is restricted because of heights of the elevating drive rods 34, otherwise they disturb to move other equipments during periodic inspection.

Furthermore, there has been yet still another problem that, in the event that only the long elevating drive rods 34 are disassembled to store the reactor internal equipment hoisting apparatus, a leveling of four elevating drive rods 34 must be set to reassembling the reactor internal equipment hoisting apparatus again and therefore it takes a long time to set such leveling.

SUMMARY OF THE INVENTION

The present invention has been made in light of the above problems in the related art, and it is an object of the present invention to provide a reactor internal equipment hoisting apparatus which is easy in maintenance and storage.

According to the present invention, there is provided a reactor internal equipment hoisting apparatus which is hung down from an upper side of a reactor pressure vessel to hoist a reactor internal equipment installed in the reactor pressure vessel, comprising a supporting unit hung down from the upper side of the reactor pressure vessel by an overhead travailing crane installed on a reactor building; an elevating unit arranged below the supporting unit; coupling/fixing means provided to the elevating unit to be releasably coupled with a hoisting lug of the reactor internal equipment; and a power hoist using a rope or a chain and provided to the supporting unit so that the rope or the chain can hang down the elevating unit from the supporting unit so as to move the elevating unit vertically.

Preferably, the reactor internal equipment hoisting apparatus further comprises a positioning member provided to the elevating unit to guide the coupling/fixing means to the hoisting lug, and wherein the coupling/fixing means has a connector pin which can be inserted releasably into a hoisting hole of the hoisting lug and a cylinder which drives back and forth the connector pin, and a pin insertion hole into which the connector pin is inserted is formed in the positioning member.

Preferably, the elevating unit is detachably attached to the rope or the chain of the power hoist.

Preferably, the supporting unit comprises a supporting frame which is formed by coupling a pair of hoisting beams to intersect with each other, the elevating unit comprises an elevating frame which is formed by coupling a pair of elevating beams to intersect with each other, and the coupling/fixing means are provided to respective end portions of the elevating beams.

Preferably, the power hoists are provided to respective end portions of the hoisting beams.

Preferably, the power hoist is any of motor-operated type, pneumatic type, oil-hydraulic type, steam pressure type, and hydraulic type hoists.

Preferably, the power hoist is a motor-operated chain block.

Preferably, a stand member which can support the supporting unit on a floor in a storage area for the reactor internal equipment hoisting apparatus or on an upper surface of the elevating unit is provided on a lower surface of the supporting unit.

Preferably, guiding plates which are engaged with a guide rod provided on an inner wall surface of the reactor pressure vessel is provided to the elevating unit so as to position the elevating unit when the elevating unit is installed into the reactor pressure vessel.

Preferably, a lightening fixture for illuminating a neighborhood of the guiding plate is provided to the supporting unit.

DETAILED DESCRIPTION OF THE PREFERRED EMBODIMENTS

A reactor internal equipment hoisting apparatus (abbreviated as a "hoisting apparatus" hereinafter) according to an embodiment of the present invention will be explained in detail with reference to FIG. 1 to FIG. 6 hereinafter.

Figure 1:
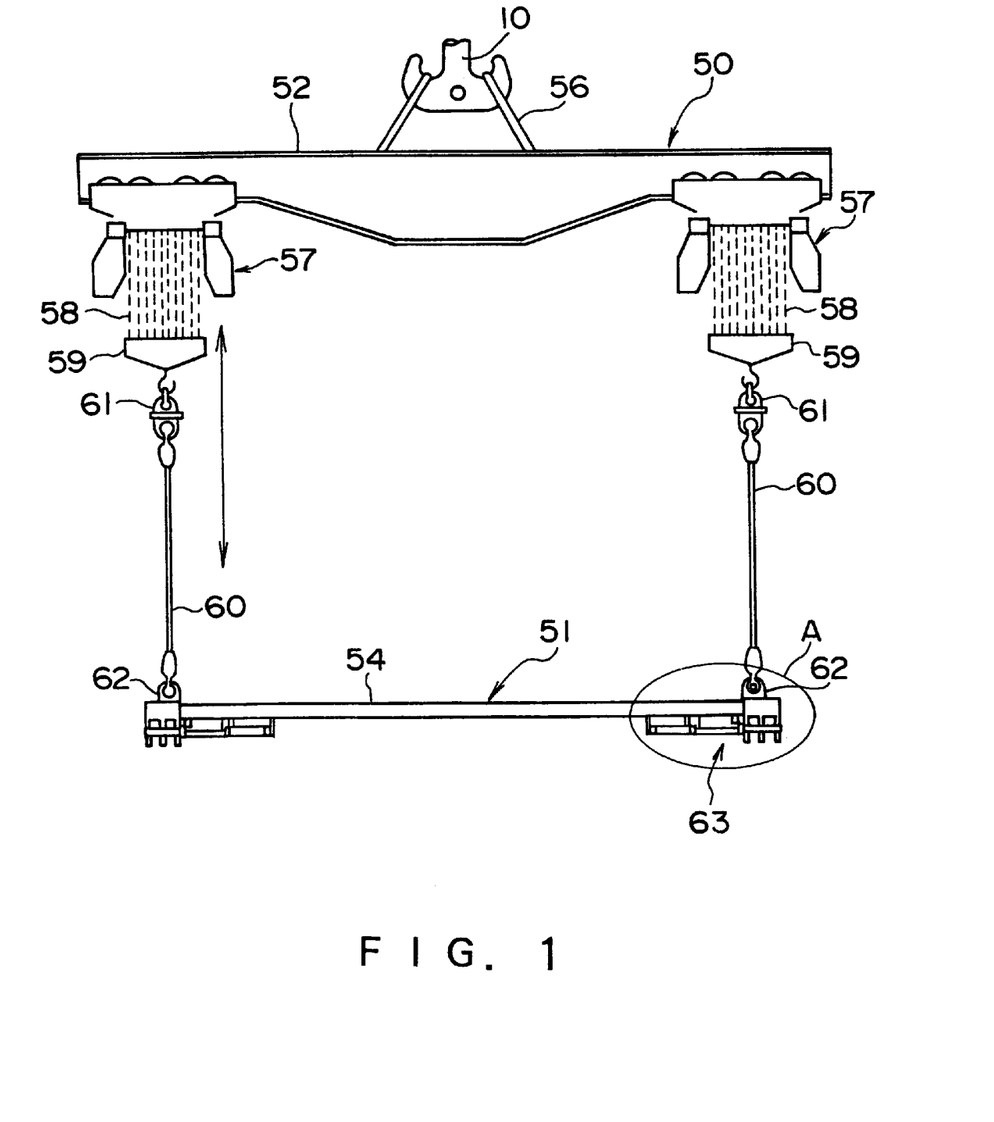
FIG. 1 is a front view showing a schematic configuration of a reactor internal equipment hoisting apparatus according to an embodiment of the present invention.
Figure 2:
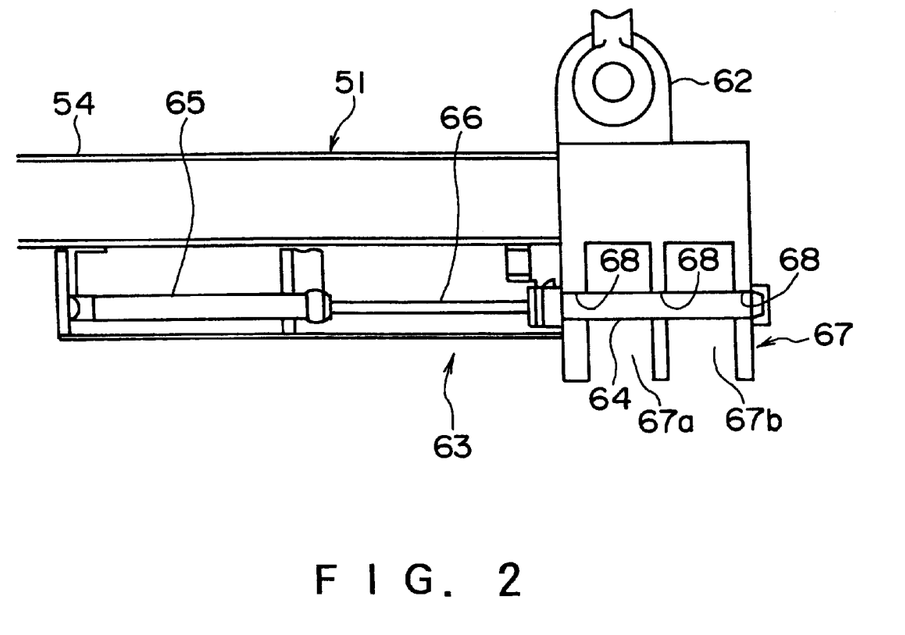
FIG. 2 is a fragmentary enlarged view showing an A portion of the configuration shown in FIG. 1 in an enlarged manner.
Figure 3:
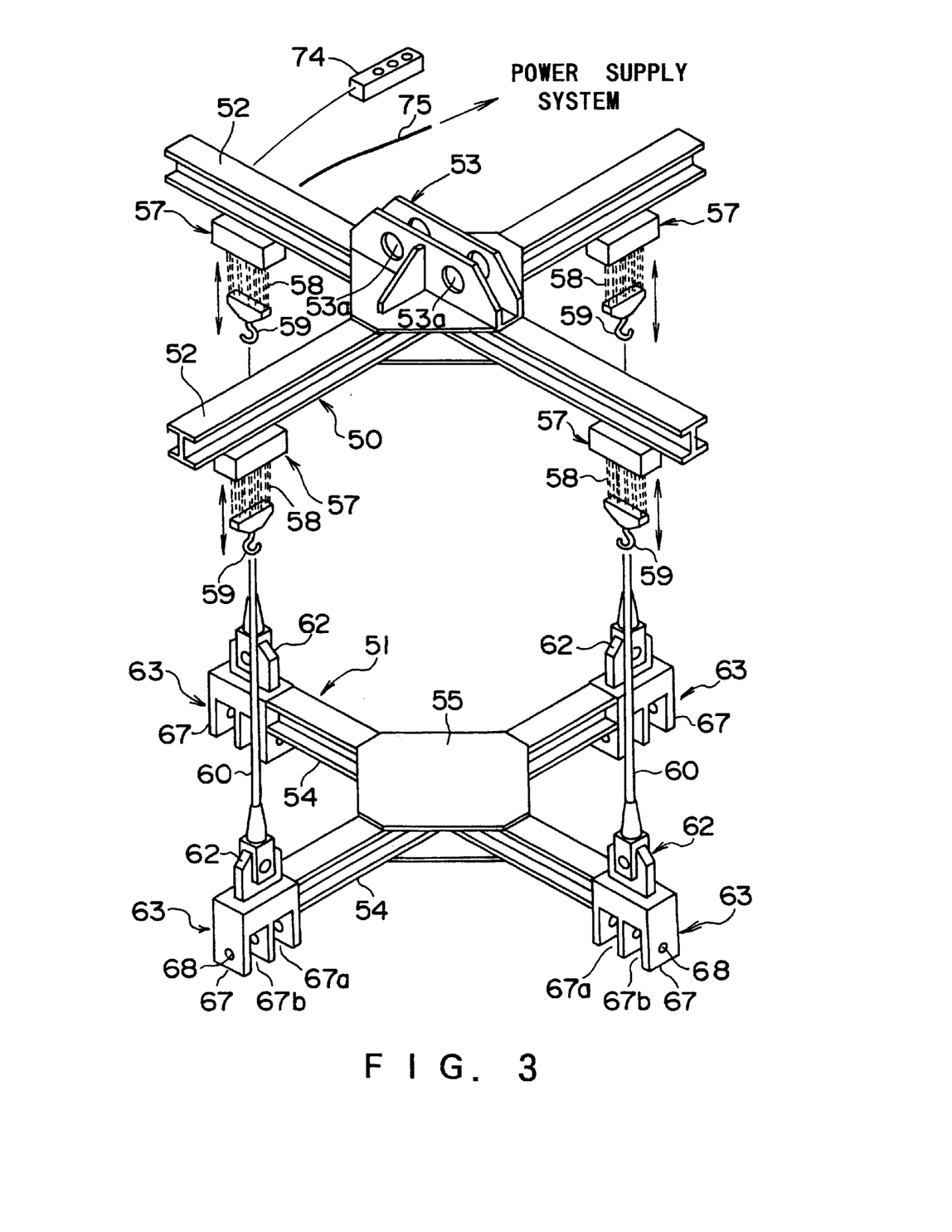
FIG. 3 is a perspective view showing the schematic configuration of the reactor internal equipment hoisting apparatus according to the embodiment of the present invention.

As shown in FIG. 1 to FIG. 3, the hoisting apparatus according to the present embodiment comprises supporting frames (supporting unit) 50 which are hung down from the upper side of the RPV, and elevating frames (elevating unit) 51 which are arranged below the supporting frames 50.

The supporting frames 50 are formed by intersecting a pair of hoisting beams 52 and coupling intersected portions by an upper attachment 53. The elevating frames 51 are formed by intersecting a pair of elevating beams 54 and coupling intersected portions by an lower attachment 55.

Figure 9:
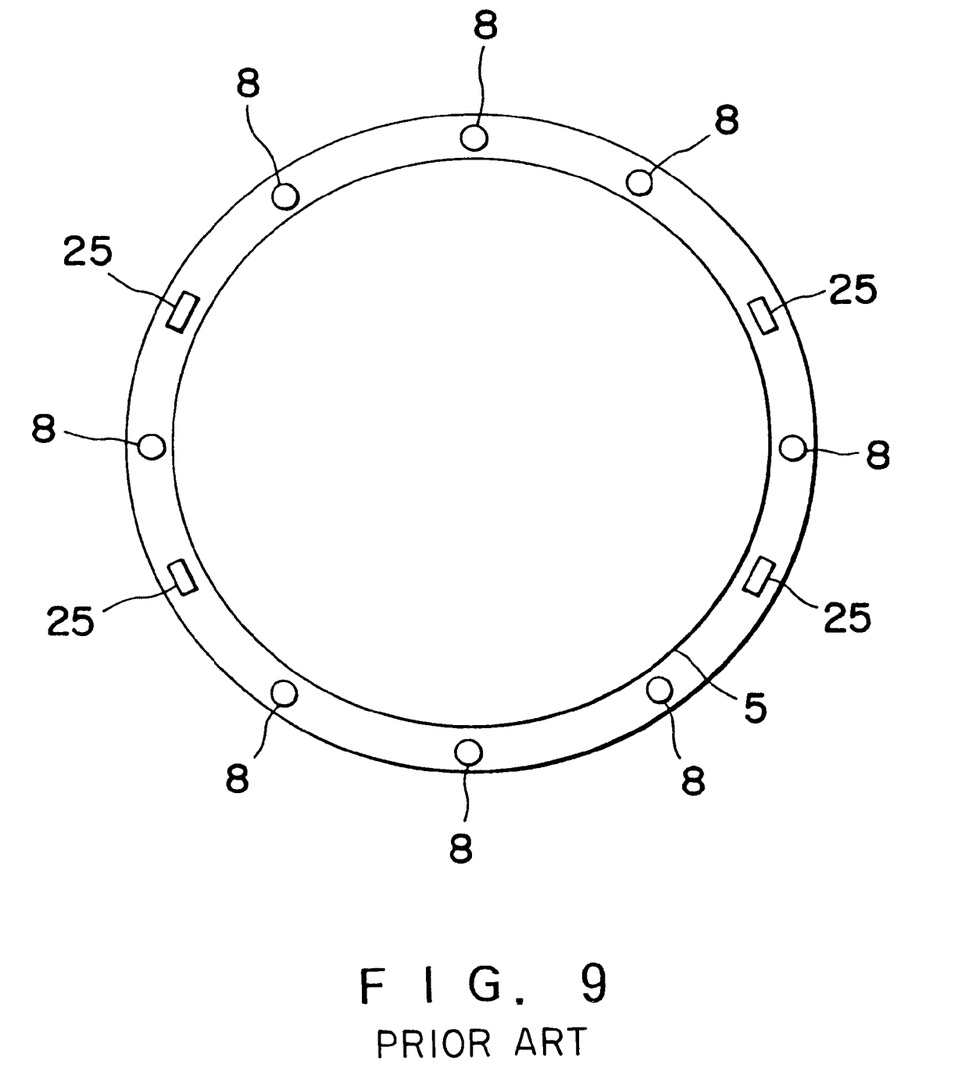
FIG. 9 is a top view showing patterns of rods and hoisting lugs of the shroud head of the BWR.

FIG. 3 shows respective intersected structures of the hoisting beams 52 and the elevating beams 54. But an intersecting angle of the beams may be decided in compliance with the arrangement pattern of the hoisting lugs 25, as shown in FIG. 8A or FIG. 9.

The supporting frames 50 shown in FIG. 1 are hung down from a hook 10 of the overhead travailing crane by dedicated wires 56. The hook 10 can be coupled with the upper attachment 53 without such dedicated wires 56 by putting the hook 10 of the overhead travailing crane in the upper attachment 53 shown in FIG. 3 and then inserting one or plural pins into pin insertion holes 53a of the upper attachment 53.

Hoists 57 made of motor-operated chain blocks are provided to end portions of a pair of hoisting beams 52 constituting the supporting frames 50. The hoists 57 have an operation pendant 74.

As the hoists 57, in addition to the above motor-operated chain blocks, various power hoists using wire ropes or chains may be employed. For example, various hoists such as motor-operated type, pneumatic type, oil-hydraulic type, steam pressure type, and hydraulic type hoists may be used.

Electric cables 75 extended from the existing power supply or temporary power supply on the operation place are connected to the hoists 57. If a hoist which utilizes a fluid pressure such as air pressure, oil pressure, etc. is employed as the hoists 57, hoses which are extended from existing or temporary supply equipment such as the pneumatic supply equipment are connected to the hoists 57.

Top end portions of dedicated wire ropes 60 are detachably attached to hook members 59 provided to bottoms of the chains 58 of the hoists 57 via fitting connectors 61 respectively. Bottom end portions of the dedicated wire ropes 60 are connected to end portions of the elevating beams 54 via hoisting connectors 62 such as shackle. In this way, the elevating frames 51 are hung down from the supporting frames 50 by the hoists 57 to be moved vertically. The chains 58 may be directly connected to the hoisting connectors 62 without the dedicated wire ropes 60.

If the elevating unit 51 is constructed like a box shape, the hook members 59 of the hoists 57 can be connected to the elevating unit 51 by using one or plural pins, as in the case where the hook 10 of the overhead traveling crane is connected to the upper attachment 53.

Coupling/fixing means 63, which are releasably connected to hoisting lugs of the reactor internal equipments, e.g., the hoisting lugs 25 (see FIGS. 8A, 8B, 8C) of the shroud head 5, are provided to respective end portions of the elevating beams 54.

As shown in FIG. 2, each of the coupling/fixing means 63 has a connector pin 64 which can be inserted releasably into a hoisting hole 26 (see FIG. 8C) of the hoisting lug 26 and a cylinder 65 which can drive back and forth the connector pin 64. Top end portions of the piston rods 66 of the cylinders 65 are secured to rear end portions of the connector pin 64 respectively.

In addition, positioning members 67 are provided to top end portions of the elevating beams 54 so as to guide the coupling/fixing means 63 to the hoisting lugs 25 respectively. Pin insertion holes 68 into which the connector pin 64 is inserted are formed in each of the positioning members 67. A guiding recess portion 67a into which the hoisting lug 25 of the shroud head 5 is inserted and a guiding recess portion 67b into which the hoisting lug of a dryer housing (not shown) is inserted are formed on each of the positioning members 67.

Figure 4:
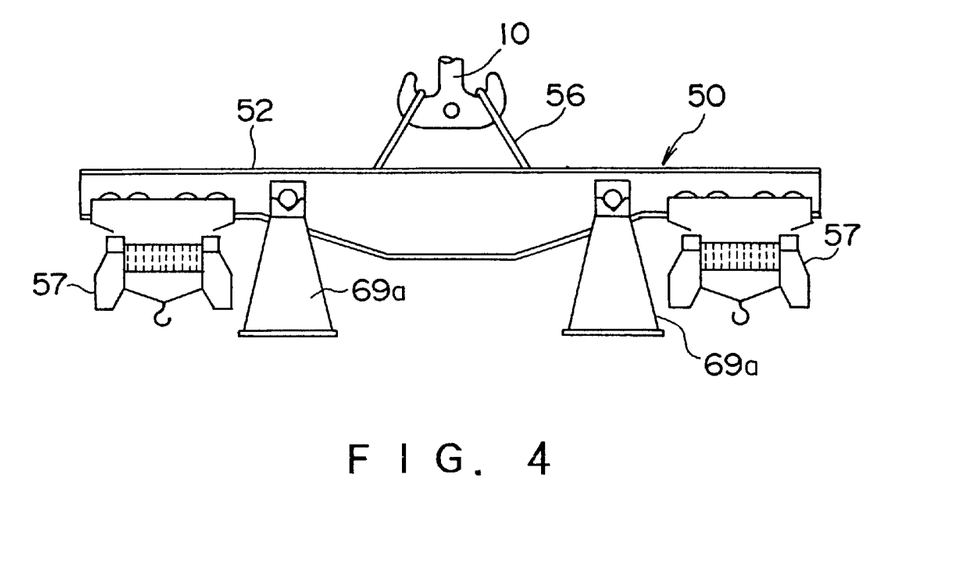
FIG. 4 is a front view showing an example in which stand members are provided to the reactor internal equipment hoisting apparatus according to the embodiment of the present invention.
Figure 5:
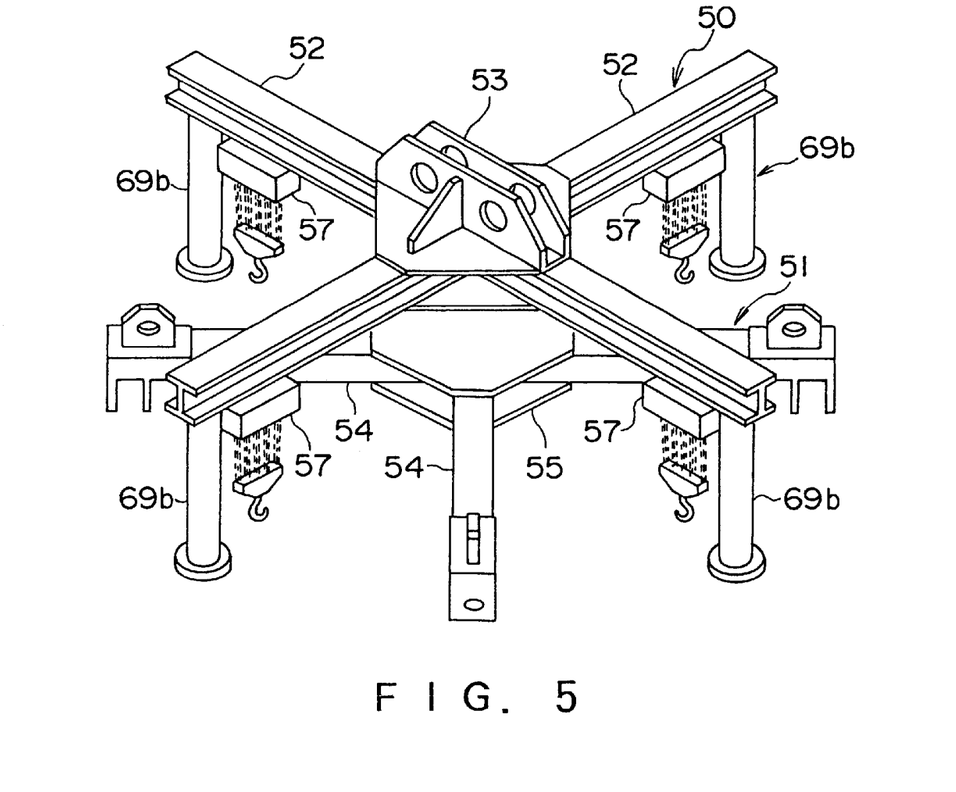
FIG. 5 is a perspective view showing another example in which stand members are provided to the reactor internal equipment hoisting apparatus according to the embodiment of the present invention, which are in its storage state.

As shown in FIG. 4 and FIG. 5, it is preferable that stand members 69a,b which can support the supporting frames 50 on a floor or on an upper surface of the elevating frames 51 are provided on lower surfaces of the supporting frames 50. If such stand members 69a,b are provided like the above, effective utilization of a storage space used to store the hoisting apparatus can be achieved.

Figure 6:
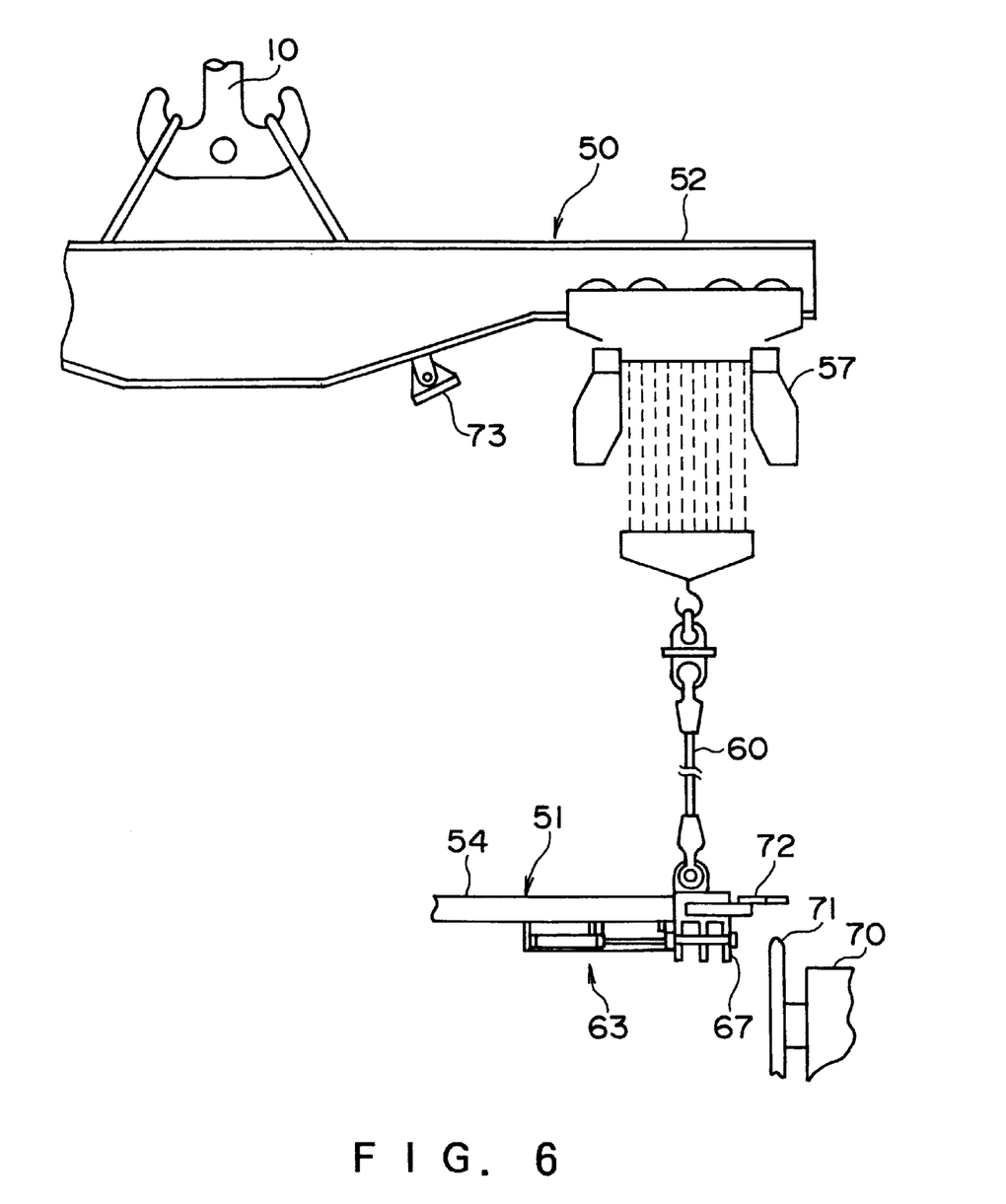
FIG. 6 is a partial front view showing an example in which guiding plates and lightening fixtures are provided to the reactor internal equipment hoisting apparatus according to the embodiment of the present invention.

Further, as shown in FIG. 6, it is preferable that, in order to position the elevating frames 51 when the elevating frames 51 are installed into the RPV 70, guiding plates 72 which are engaged with guide rods 71 fixedly provided on an inner wall surface of the RPV 70 are provided to the elevating frames 51. If the guiding plates 72 are provided in this fashion, the positioning members 67 provided to the elevating frames 51 can be easily set on the hoisting lugs 25 without fail.

Furthermore, if lightening fixtures 73 for illuminating neighborhoods of the guiding plates 72 respectively are provided to the supporting frames 50, an operation for positioning the guiding plates 72 to the guide rods 71 can be safely performed without fail. In the related art, the operation for setting the lightening devices by the operator every time when the elevating unit is elevated must be needed. However, such troublesome operation can be neglected in the present invention.

In turn, procedures conducted when the reactor internal equipments are carried out of the RPV by using the hoisting apparatus according to the embodiment of the present invention will be explained hereinafter.

Under the condition that the reactor well is filled with the core water, first the hoisting apparatus is moved toward the upper side of the RPV by the overhead traveling crane, and then the supporting frames 50 are lowered until the hook members 59 of the hoists 57 come up to the level of the core water.

After this, the hoists 57 are driven by operating the operation pendant 74 to sink the elevating frames 51 under the core water such that the elevating frames 51 are then put onto the reactor internal equipments, for example, the upper surface of the shroud head 5. In such lowering operation of the elevating frames 51, the guiding plates 72 and their peripheries are illuminated by the lighting fixtures 73 shown in FIG. 6. Also, by engaging the guiding plates 72 with the guide rods 71, the guiding recess portions 67a or 67b of the positioning members 67 provided to the elevating frames 51 can be surely set on the hoisting lugs of the reactor internal equipments, e.g., the hoisting lugs 25 of the shroud head 5.

Then, under the condition that the hoisting lugs of the reactor internal equipments are inserted into the guiding recess portions 67a or 67b of the positioning members 67 provided to the elevating frames 51, the piston rods 66 are moved forward by driving the cylinders 65 by means of fluid pressure such as air pressure, oil pressure, etc. As a result, the connector pins 64 can be inserted into the pin insertion holes 68 of the positioning members 67, so that coupling of the elevating frames 51 and the reactor internal equipments can be achieved.

Next, the hoists 57 are driven by operating the operation pendant 74 to thus lift up the reactor internal equipments from the RPV. Then, the reactor internal equipments are carried into the equipment storage pool by driving the overhead traveling crane.

If the reactor internal equipments which have been taken out from the RPV are to be carried into the RPV once again, operations are conducted in reverse order of the above-mentioned procedures.

After the operations have been completed, the supporting frames 50 and the elevating frames 51 are disconnected by the fitting connectors 61. Then, as shown in FIG. 5, the supporting frames 50 and the elevating frames 51 are stored by putting the supporting frames 50 on the elevating frames 51 by means of the stand members 69.

As described above, according to the hoisting apparatus of the embodiment of the present invention, since the elevating frames 51 can be moved vertically relative to the supporting frames 50 by using the hoists 57, the reactor internal equipments can be carried into the core and carried out of the core without immersion of the hook 10 and the wire ropes of the overhead traveling crane in the core water even under the condition that the reactor well is still filled with the core water.

Accordingly, there is no need of adjusting the level of the core water in the reactor well vertically to mate with respective heights of the reactor internal equipments being elevated when the reactor internal equipments are to be moved upward or downward in the reactor well. As a result, the operations for carrying in and carrying out the reactor internal equipments can be quickly performed.

According to the hoisting apparatus of the embodiment of the present invention, since the elevating frames 51 can be hung down from the supporting frames 50 via the hoists 57 made of the motor-operated chain blocks to be moved vertically, a configuration of the hoisting apparatus can be simplified rather than the previous hoisting apparatus shown in FIG. 10. Hence, an efficiency in decontamination operation of the hoisting apparatus can be improved and also radiation exposure of the operator during the decontamination operation can be reduced.

Moreover, according to the hoisting apparatus of the embodiment of the present invention, a height of the hoisting apparatus can be smaller than the previous hoisting apparatus shown in FIG. 10 and in addition the supporting frames 50 and the elevating frames 51 can be stored in their disconnected state. Therefore, handling of the hoisting apparatus can be made easy and the space required for storage can be reduced.

As described above, according to the hoisting apparatus of the present invention, since the elevating unit can be moved vertically relative to the supporting unit by using the power hoist using the wire rope or the chain, the carry-in and carry-out operations of the reactor internal equipments can be quickly performed without immersion of the hook and the wire rope of the overhead traveling crane in the core water even under the condition that the reactor well is still filled with the core water. Also, since the configuration of the hoisting apparatus is simplified, the efficiency in decontamination operation of the hoisting apparatus can be enhanced and also radiation exposure of the operator during the decontamination operation can be reduced. In addition, handling of the hoisting apparatus can be made easy and the space required for storage can be reduced.

What is claimed is:

1. A reactor internal equipment hoisting apparatus which is hung down from an upper side of a reactor pressure vessel to hoist a reactor internal equipment installed in the reactor pressure vessel, comprising:

a supporting unit hung down from the upper side of the reactor pressure vessel by an overhead travailing crane installed on a reactor building;

an elevating unit arranged below the supporting unit;

a coupling/fixing unit provided to the elevating unit to be releasably coupled with a hoisting lug of the reactor internal equipment;

a power hoist using a rope or a chain and provided to the supporting unit so that the rope or the chain can hang down the elevating unit from the supporting unit so as to move the elevating unit vertically;

wherein the supporting unit comprises a supporting frame which is formed by coupling a pair of hoisting beams to intersect with each other;

the elevating unit comprises an elevating frame which is formed by coupling a pair of elevating beams to intersect with each other; and a coupling/fixing unit is provided to respective end portions of the elevating beams.

2. The reactor internal equipment hoisting apparatus according to claim 1, further comprising a positioning member provided to the elevating unit to guide the coupling/fixing unit to the hoisting lug, and wherein the coupling/fixing unit has a connector pin which can be inserted releasably into a hoisting hole of the hoisting lug and a cylinder which drives back and forth the connector pin, and a pin insertion hole into which the connector pin is inserted is formed in the positioning member.

3. The reactor internal equipment hoisting apparatus according to claim 1, wherein the elevating unit is detachably attached to the rope or the chain of the power hoist.

4. The reactor internal equipment hoisting apparatus according to claim 1, wherein the power hoist is provided to respective end portions of the hoisting beams.

5. The reactor internal equipment hoisting apparatus according to claim 1, wherein the power hoist is any one of a motor-operated hoist, a pneumatic hoist, an oil-hydraulic hoist, a steam pressure hoist, and a hydraulic hoist.

6. The reactor internal equipment hoisting apparatus according to claim 5, wherein the power hoist is a motor-operated chain block.

7. A reactor internal equipment hoisting apparatus which is hung down from an upper side of a reactor pressure vessel to hoist a reactor internal equipment installed in the reactor pressure vessel, comprising:

a supporting unit hung down from the upper side of the reactor pressure vessel by an overhead travailing crane installed on a reactor building;

an elevating unit arranged below the supporting unit;

a coupling/fixing unit provided to the elevating unit to be releasably coupled with a hoisting lug of the reactor internal equipment;

a power hoist using a rope or a chain and provided to the supporting unit so that the rope or the chain can hang down the elevating unit from the supporting unit so as to move the elevating unit vertically; and a stand member provided on a lower surface of the supporting unit, which can support the supporting unit on a floor in a storage area for the reactor internal equipment hoisting apparatus or on an upper surface of the elevating unit.

8. The reactor internal equipment hoisting apparatus according to claim 7, further comprising a positioning member provided to the elevating unit to guide the coupling/fixing unit to the hoisting lug; and wherein the coupling/fixing unit has a connector pin which can be inserted releasably into a hoisting hole of the hoisting lug and a cylinder which drives back and forth the connector pin; and a pin insertion hole into which the connector pin is inserted is formed in the positioning member.

9. The reactor internal equipment hoisting apparatus according to claim 7, wherein the elevating unit is detachably attached to the rope or the chain of the power hoist.

10. The reactor internal equipment hoisting apparatus according to claim 7, wherein the power hoist is any one of a motor-operated hoist, a pneumatic hoist, an oil-hydraulic hoist, a steam pressure hoist, and hydraulic hoist.

11. The reactor internal equipment hoisting apparatus according to claim 10, wherein the power hoist is a motor-operated chain block.

12. A reactor internal equipment hoisting apparatus which is hung down from an upper side of a reactor pressure vessel to hoist a reactor internal equipment installed in the reactor pressure vessel, comprising:

a supporting unit hung down from the upper side of the reactor pressure vessel by an overhead travailing crane installed on a reactor building;

an elevating unit arranged below the supporting unit;

a coupling/fixing unit provided to the elevating unit to be releasably coupled with a hoisting lug of the reactor internal equipment;

a power hoist using one of a rope and a chain provided to the supporting unit so that the rope or the chain can hang down the elevating unit from the supporting unit so as to move the elevating unit vertically; and a guiding plate provided to the elevating unit, which is engaged with a guide rod provided on an inner wall surface of the reactor pressure vessel so as to position the elevating unit when the elevating unit is installed into the reactor pressure vessel.

13. The reactor internal equipment hoisting apparatus according to claim 12, further comprising a positioning member provided to the elevating unit to guide the coupling/fixing unit to the hoisting lug;

wherein the coupling/fixing unit has a connector pin which can be inserted releasably into a hoisting hole of the hoisting lug and a cylinder which drives back and forth the connector pin; and a pin insertion hole into which the connector pin is inserted is formed in the positioning member.

14. The reactor internal equipment hoisting apparatus according to claim 12, wherein the elevating unit is detachably attached to the one of the rope and the chain of the power hoist.

15. The reactor internal equipment hoisting apparatus according to claim 12, wherein the power hoist is any one of a motor-operated hoist, a pneumatic hoist, an oil-hydraulic hoist, a steam pressure hoist, and a hydraulic hoist.

16. The reactor internal equipment hoisting apparatus according to claim 15, wherein the power hoist is a motor-operated chain block.

17. The reactor internal equipment hoisting apparatus according to claim 12, further comprising a lighting fixture provided to the supporting unit for illuminating a neighborhood of the guiding plate.

* * * * *